United States Patent
Polati De Souza et al.

(10) Patent No.: US 9,405,295 B2
(45) Date of Patent: Aug. 2, 2016

(54) FLIGHT CONTROL SYSTEM

(75) Inventors: Alvaro Vitor Polati De Souza, Sao Jose dos Campos-SP (BR); Fabricio Reis Caldeira, Sao Jose dos Campos-SP (BR); Dagfinn Gangsaas, Mindens, NV (US); Jerome Klein, Seattle, WA (US); Lauro Rocha Borges, Sao Jose dos Campos-SP (BR); Reneu Luiz Andrioli, Jr., Sao Jose dos Campos-SP (BR); Luciano Tury Pastorini, Sao Jose dos Campos-SP (BR); Marco Paulo Fonseca, Pooler, GA (US)

(73) Assignee: EMBRAER S.A., Sao Jose dos Campos (BR)

( * ) Notice: Subject to any disclaimer, the term of this patent is extended or adjusted under 35 U.S.C. 154(b) by 881 days.

(21) Appl. No.: 12/518,361

(22) PCT Filed: Dec. 11, 2007

(86) PCT No.: PCT/BR2007/000340
§ 371 (c)(1),
(2), (4) Date: May 5, 2010

(87) PCT Pub. No.: WO2008/070944
PCT Pub. Date: Jun. 19, 2008

(65) Prior Publication Data
US 2010/0217460 A1 Aug. 26, 2010

(30) Foreign Application Priority Data
Dec. 11, 2006 (GB) .................................. 0624700.1

(51) Int. Cl.
G01C 23/00 (2006.01)
G05D 1/00 (2006.01)
(Continued)

(52) U.S. Cl.
CPC ................ G05D 1/0676 (2013.01); G05D 1/08 (2013.01); G05D 1/0808 (2013.01)

(58) Field of Classification Search
USPC .......... 701/3, 18, 4, 6, 8, 10, 11, 14; 244/113, 244/183, 75.1, 76 R, 87, 90 R, 175, 181, 244/194, 228
See application file for complete search history.

(56) References Cited

U.S. PATENT DOCUMENTS 3,040,316 A 6/1962 Sather
3,252,675 A 5/1966 Close et al.
(Continued)

FOREIGN PATENT DOCUMENTS

EP 0680877 A1 8/1995
WO 2006016070 A1 2/2006

OTHER PUBLICATIONS

Roger W. Pratt, Flight Control Systems: Practical Issues in Design and Implementation, 2000, The Institution of Electrical Engineers, p. 1-196.*

(Continued)

Primary Examiner — Yonel Beaulieu
Assistant Examiner — Lail Kleinman
(74) Attorney, Agent, or Firm — Nixon & Vanderhye P.C.

(57) ABSTRACT

A flight control system commands drag devices such as flight spoilers according to pilot or autopilot longitudinal command. Furthermore, the flight control system monitors a set of flight parameters to determine whether the aircraft is operating inside the permitted safe envelope, hence, incorporating envelope automatic exceeding disengagement. This invention allows the aircraft to descend in a steeper glide path than the 3° used in the normal approach, while keeping speeds unchanged.

22 Claims, 4 Drawing Sheets

(51) Int. Cl.
*G05D 3/00* (2006.01)
*G06F 7/00* (2006.01)
*G06F 17/00* (2006.01)
*G05D 1/06* (2006.01)
*G05D 1/08* (2006.01)

(56) References Cited

U.S. PATENT DOCUMENTS

| | | | |
|---|---|---|---|
| 3,589,648 A * | 6/1971 | Gorham et al. | 244/186 |
| 3,870,253 A * | 3/1975 | Leidy et al. | 244/46 |
| 4,106,730 A * | 8/1978 | Spitzer et al. | 244/183 |
| 4,261,537 A | 4/1981 | Tisdale, Sr. et al. | |
| 4,266,743 A | 5/1981 | Kelley | |
| 4,363,098 A * | 12/1982 | Buus et al. | 701/4 |
| 4,849,900 A * | 7/1989 | Blight et al. | 701/7 |
| 5,112,009 A | 5/1992 | Farineau | |
| 5,823,479 A * | 10/1998 | Nield et al. | 244/187 |
| 6,246,929 B1 * | 6/2001 | Kaloust | G05D 1/0816 244/178 |
| 2003/0106961 A1 * | 6/2003 | Wyrembek et al. | 244/113 |
| 2004/0093130 A1 * | 5/2004 | Osder et al. | 701/3 |
| 2004/0155146 A1 | 8/2004 | Wyrembek et al. | |
| 2005/0065672 A1 * | 3/2005 | Chardon et al. | 701/4 |

OTHER PUBLICATIONS

International Search Report for PCT/BR2007/000340, mailed Aug. 27, 2008.
Written Opinion of the International Searching Authority for PCT/BR2007/000340, Aug. 27, 2008.
United Kingdom Examination Reports dated Apr. 20, 2007 and Dec. 24, 2008 in GB0624700.

* cited by examiner

FLIGHT CONTROL SYSTEM

This application is the U.S. national phase of International Application No. PCT/BR2007/000340 filed 11 Dec. 2007, which designated the U.S. and claims priority to Great Britain Application No. 0624700.1 filed 11 Dec. 2006, the entire contents of each of which are hereby incorporated by reference.

The present invention relates to a flight control system for an aircraft.

Considering an aircraft, equipped with an engine, it is well known that there exists a maximum descent glide slope possible in a constant airspeed steady state flight. This will depend on the lift, drag and thrust produced by the aircraft in such a flight condition. The problem is that some operations require capability of performing a steady flight in a steeper descent path, although, depending on the conditions mentioned above, a given aircraft may lack this capability at a certain relatively low airspeed. In these cases, the most commonly used solution is to introduce devices, mechanisms and methods to produce more drag in the aircraft, in order permit a steeper descent trajectory. In the prior art, many proposed solutions utilise drag devices, e.g. airbrakes, flight spoilers, dive brakes and others.

An object of the present invention is to provide a flight control system which can achieve a relatively steep descent (using drag devices such as flight spoilers for example) at relatively low speeds.

It is well known in aeronautics engineering that drag devices such as flight spoilers are capable of increasing the maximum descent ratio. Consequently, prior art arrangements have used such devices in order to increase the angle of the glide path. Nevertheless, this sort of solution may have drawbacks because of undesirable collateral effects caused by using such devices, as follows:

i) For a given angle of attack, it is possible that drag devices such as spoilers reduce the lift produced by the aircraft, thus reducing significantly the margins to the stall condition. Consequently, there is a concern regarding the speed margins that are required for a safe flight operation. It is possible that speed enhancements will be necessary in order to regain the same margins as before, jeopardizing the performance of aircraft approaches.

ii) It is desirable for the aircraft to carry the same payload; thus the total lift must be maintained in the steep descent configuration, regardless of the fact that drag devices such as spoilers might kill some lift. In these cases, other parts of the aircraft will be loaded more to compensate for this fraction of killed lift, occasionally producing local overloading problems.

iii) Deterioration of flying qualities, especially during steep approaches, flare and landing manoeuvres.

iv) Exposure to high touch down sink rate and tail strike in steep approaches and landings.

In view of the above, some attempts have been made in the prior art to incorporate some control of these surfaces, to reduce some of the effects mentioned above. The prior art includes the following:

U.S. Pat. No. 3,589,648 by Gorhan and Richter proposes a device in which the spoilers are biased to a predetermined position, and are commanded around this position depending on a signal received from an autopilot. The autopilot produces those signals based on a comparison between a reference trajectory, which is desirable; and the real trajectory sensed by aircraft systems. Hence, this patent discloses a command to the spoiler to correct the flight trajectory using a feedback signal, augmenting the aircraft response.

In U.S. Pat. No. 3,738,594 to Donovan and Wood, a mechanism is proposed in which spoilers are also biased to a predetermined position. Further, the aircraft pitch command is connected to the spoilers through a "washout" or viscous damping mechanism, in such a way that a quicker pitch command produces a higher amplitude spoiler movement around the biased position, after which the inputs to the spoiler actuators are gradually returned to the original bias position.

U.S. Pat. No. 3,774,869 to Harmon discloses a mechanism for connecting the throttle to the spoilers and dive brakes (this surface being located under the wing). In these cases, the inventors created a mechanism to coordinate the spoiler handle with thrust lever commands, i.e., the drag produced by the spoiler augments the thrust changes commanded by the pilot. Similar systems are presented in U.S. Pat. No. 3,850,388 to Olcott et al., and U.S. Pat. No. 4,489,907 to Ziegelmeyer.

In the arrangement disclosed in WO 2006/016070A1, in the names of Boissenin and Rosay, spoilers are also deployed to a biased predetermined position. In this invention, the spoilers remain fixed in this position up to certain altitude, whence they are automatically and gradually commanded to a more faired position. Further, in this invention, hyper lifting devices are commanded in coordination with spoiler closure. There is no spoiler modulation based on pilot longitudinal commands.

In all of the above disclosures, some control is incorporated to attain an improvement of flying qualities.

In one aspect the invention provides a flight control system for an aircraft having a drag device for increasing the angle of the descent path, the flight is control system comprising processing means for monitoring a plurality of flight parameters associated with a safe operating envelope of the aircraft, and control means coupled to the drag device and arranged to keep the aircraft within the safe operating envelope by reducing the drag of the drag device in response to an output of the processing means.

By monitoring the flight parameters and automatically closing the drag devices if the operative envelope of the function is exceeded, it is ensured that the stall and structure limit margins as found in the configuration with the drag devices faired are maintained, without any requirement for a physical modification of the airframe.

In another aspect the invention provides a flight control system for an aircraft, the flight control system comprising processing means for monitoring a plurality of flight parameters, wherein said processing means is arranged to generate a Boolean function of a plurality of logical inputs associated with the respective flight parameters and to generate an output signal, the flight control system being arranged to control at least one longitudinal flight control surface in response to said output signal and to a pilot or autopilot longitudinal command signal.

In a preferred embodiment the above flight control system commands drag devices such as a set of flight spoiler pairs, keeping or enhancing the flying qualities and manoeuvreability by modulating the drag devices as a function of longitudinal control, further providing an innovative protection to keep the same margins and structural loading as found in a conventional flight control system.

In this new system, as found in the prior art, the spoilers are preferably biased to a predetermined position, although a new command mechanism is provided. The position of the spoilers is preferably computed as a function of longitudinal pilot (or autopilot) command.

In a preferred embodiment the system provides a spoiler command which creates extra drag as required in steep descents, approaches and landings. Beyond creating extra drag, the flight control system preferably provides a spoiler augmentation command to enhance the longitudinal control of the aircraft, which is a modulation based on a pilot longitudinal command, used in conjunction with the elevators command.

The system preferably includes a logic module that receives a set of signals, and its task is to decide when the system is engaged, and thus, when the spoilers are deployed. The logic module optionally also receives a signal from a cockpit switch used to allow the pilot to override (i.e. engage or disengage) the system.

The function of the set of signals received by logic module is preferably twofold:
i) to identify the state of the flight; and
ii) to check the aircraft configuration,
and decide if the system is operating within its operational envelope.

In response to the above, an automatic envelope exceeding disengagement may be triggered. This feature provides structural protection, stall protection, and reduces the pilot workload when changing the aircraft configuration.

Furthermore, in preferred embodiments the longitudinal control surface sensitivities to their command signals are modified to give better flying qualities when flying with the new system engaged. When engaging or disengaging the function. i.e., the spoilers commanded to the biased position, an automatic longitudinal command is sent to elevators or to horizontal stabilizer in order to provide an automatic balancing of longitudinal moments due to spoiler pitch moment.

The invention also extends to an aircraft including the above-defined flight control systems.

Further preferred features are defined in the dependent claims.

A preferred embodiment of the invention is described below by way of example only with reference to FIGS. 1 to 6 of the accompanying drawings, wherein.

Figure 1:
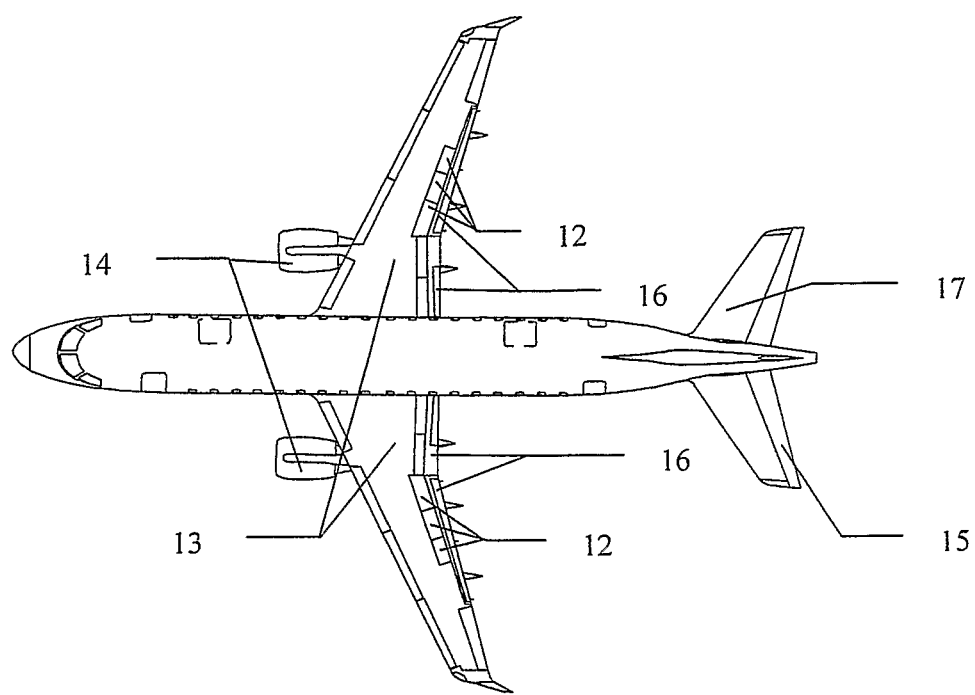
FIG. 1 is a schematic plan view of one aircraft—a civil transporter turbo-fan.

The preferred embodiment of the invention is a system used in an aircraft equipped with longitudinal control, and a drag device, such as spoilers, dive brakes, airbrakes, etc. FIG. 1 shows an example: a twin turbo-fan engined civilian transporter aircraft, with a wing (13) equipped with flight spoilers (12) installed in its upper surface.

Figure 2:
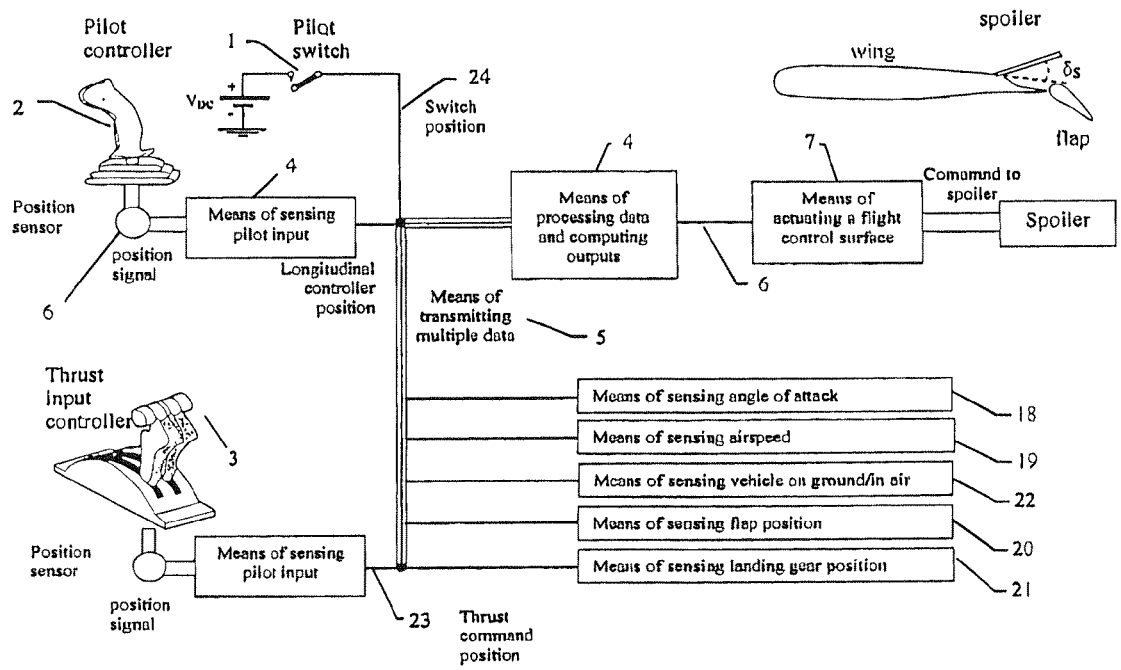
FIG. 2 is a schematic block diagram of the preferred embodiment of the flight control system of the present invention, showing the basic architecture of the system.

Referring to FIG. 2, the aircraft is equipped with a pilot switch 1 used to allow the pilot to command the engagement or disengagement of the present system. The term pilot switch encompasses a plurality of devices used in the aeronautic industry to permit the pilot to turn ON or OFF a system, comprising push buttons, levers, rotating buttons, and others. This flight control system receives the input position signals from the pilot longitudinal controller 2 command (p), and from pilot throttle lever 3 ($\delta_T$). The term pilot controller encompasses a plurality of devices used in aeronautics industry to allow the interface with the human pilot, e.g. columns, mini-columns, sticks, side-sticks and all others. The term pilot throttle lever encompasses a plurality of devices used in aeronautics to permit pilot interaction with the aircraft engine plant, which produces the thrust.

Further, the system receives signals from a set of sensors, namely: angle of attack 18 ($\delta$), airspeed 19 (u), the flap position 20 ($\delta_F$), gear position 21 ($\delta_G$) and the in on-ground/in-air status 22 ($b_{AIR}$).

The information flows via a parallel data bus 5. All these data, i.e. pilot commands, and sensor outputs, are sent to a programmable microprocessor (4). Then, microprocessor 4 is able to compute a spoiler command 6 based on the input data received. This command is sent to a means for actuating a flight control surface 7, which comprises a control unit able to command the spoiler surfaces to the commanded position. Consequently, the spoiler surfaces are deployed according to the command computed by microrocessor 4.

Figure 3:
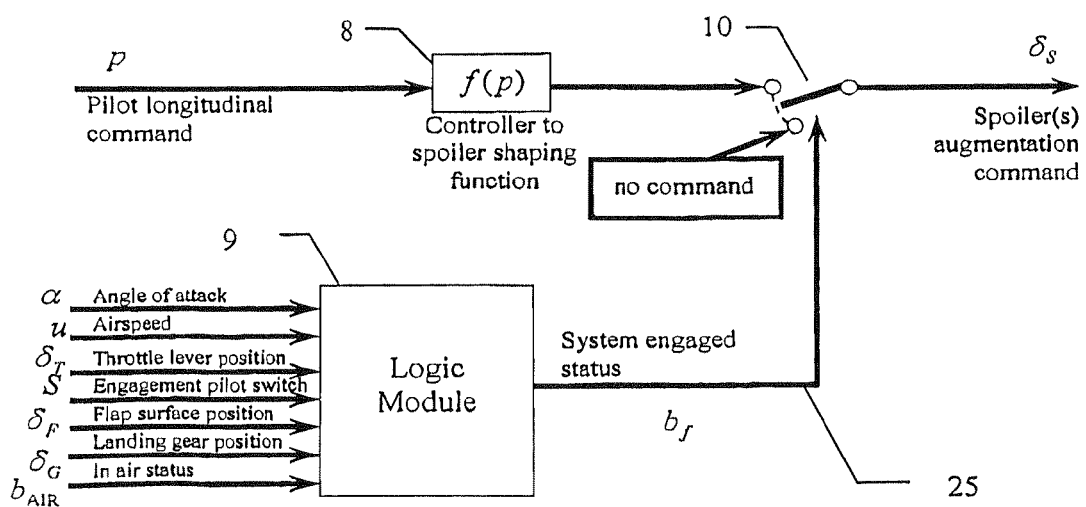
FIG. 3 is a schematic diagram of the function of the software of the above flight control system, showing how the pilot command is transformed to a spoiler command under the control of a logic module.

FIG. 3 details the program coded in microprocessor 4, presenting a signal flow schematic. This way, the system comprises a controller to spoiler function 8, a logic module 9 and a logical signal switch 10.

The logic module 9 receives a set of signals that defines its operational envelope and state of flight, which comprise: the angle of attack 18 ($\delta$), airspeed 19 (u), pilot throttle lever position 23 ($\delta_T$), the hyper-lifting devices (e.g. flap and/or slats) position 20 ($\delta_F$), landing gear position 21 ($\delta_G$) and on-ground/in-air status 22 ($b_{AIR}$). These variables, as well as the engagement pilot switch signal 24 (S) are all used in the logic module which calculates a Boolean signal function engaged status 25 ($b_f$), which is TRUE if the system is engaged and operating, or FALSE if it is not engaged.

The airspeed in aviation is a parameter computed based on airdata sensors, such as impact pressure or dynamic pressure. The speed is computed based on those data, or equivalently those raw parameters may be used directly instead of airspeed. Additionally, the logic module 9 may be responsive to a stall warning signal indicative of the stall warning system margin being exceeded. The stall warning system margin may be as defined in FAR/JAR 25.207 "Stall Warning" for example.

Figure 4:
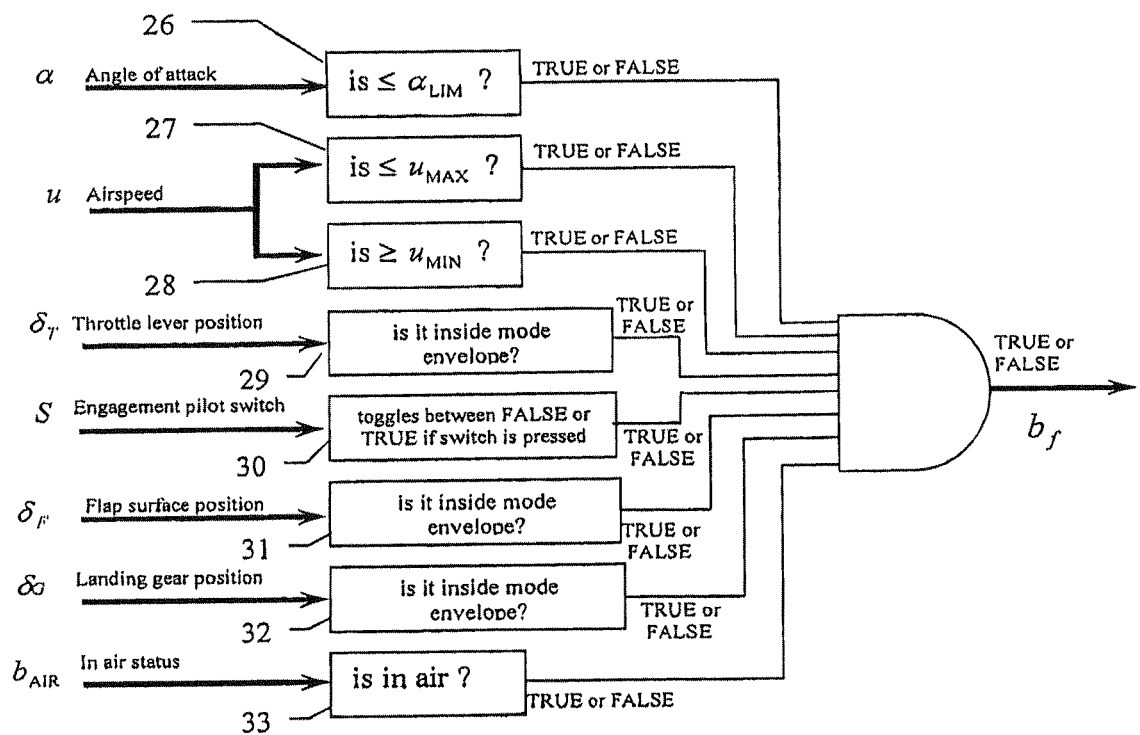
FIG. 4 is a diagram showing the details of the logic module, which enables the spoiler command based on a series of sensor inputs.
Figure 5:
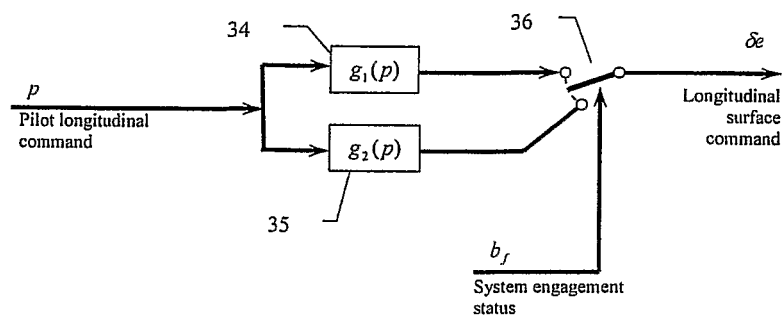
FIG. 5 is a diagrammatic illustration of the longitudinal control command of the system.

The logic module 9 is detailed in the schematic of FIG. 4. The logic module comprises the following logical interlocks: the angle of attack ($\delta$) shall be lower than a maximum angle permitted ($\delta_{LIM}$) (26), the airspeed shall be lower than $u_{MAX}$ speed (27) and greater than $u_{MIN}$ speed limits (28), and the aircraft shall be in air ($b_{AIR}$ is TRUE) (33).

Further, the logic module comprises interlocks 29, 31 and 32 to identify the aircraft configuration, using respectively the parameters of pilot throttle angle ($\delta_T$), hyper-lifting devices (flap and/or slat) position ($\delta_F$) and the gear position ($\delta_G$). Basically, the logic module 9 compares the current aircraft configuration with that permitted to the system to be operative, and defined a priori.

Thus if all the above interlocks are TRUE then the aircraft is safely within the flight control system envelope.

The switch signal (S) toggles the state of the Boolean signal function engaged status ($b_f$) according to the logic function 30: i) if $b_f$ is FALSE, and the parameter S indicates that the switch is pressed, and if all other interlocks are TRUE, $b_f$ toggles to TRUE, ii) if bf is TRUE and the parameter S indicates that the switch is pressed, $b_f$ toggles to FALSE. Even if the switch status S is TRUE, the logic shown in FIG. 4 prevents flying outside the flight control system envelope.

The logic switch 10 in FIG. 3 is used to select whether the command augmentation to spoiler is enabled: if the system is engaged ($b_f$=TRUE), the spoiler augmentation command from 8 is activated, otherwise, if disengaged ($b_f$=FALSE), the spoiler augmentation command is deactivated. Hence, when engaged ($b_f$=TRUE), the pilot or autopilot longitudinal command is linked to the spoilers through the function $f(p)$ in 8, i.e., the spoiler will deploy fill in $\delta_S = f(p)$, augmenting the aircraft longitudinal control.

In this way, the system commands a set of spoilers (which may comprise any number of flight spoiler pairs (or other drag devices)) selected a priori to be enabled to perform the required function. Therefore the system shown in the FIG. 2 can command any and all suitable spoilers.

This embodiment thus provides a spoiler command modulated by the longitudinal command of aircraft, via a spoiler augmentation command.

The preferred embodiment of the flight control system changes the "gearing" ie the input:output slope of the control function of the pilot longitudinal controller to the longitudinal flight control surface; for instance, the elevator (15). A new gearing function 35 is used instead of another 34 used in the clean configuration without the drag device. The command is switched by a logic switch 36, which is activated by the function engaged status ($b_f$) (25).

Figure 6:
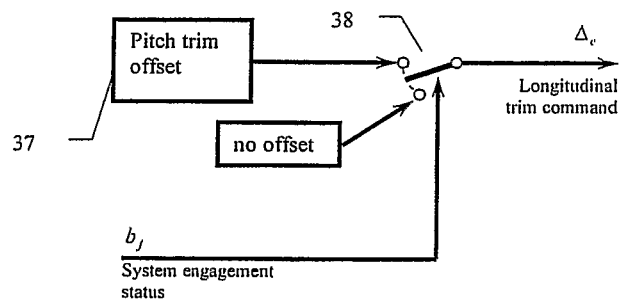
FIG. 6 is a diagrammatic illustration of the longitudinal trim command of the system.

Referring to FIG. 6, the flight control system includes an automatic longitudinal trim command offset to the pitch trim device. When the system engaged status $b_f$=TRUE, an automatic pitch trim offset 37 is sent via a pitch trim command, to reduce the pilot workload during the function engagement. When disengaging, an opposite direction trim occurs because of the offset is removed.

The term pitch trim device refers to the devices responsible to balance the longitudinal moments and neutralizing the pilot/autopilot longitudinal command/force. The most common pitch trim devices are canards, trim tabs and horizontal stabilizer. For instance, in the twin-engine transporter of FIG. 1, the pitch trim device is performed by a movable horizontal stabilizer surface 17.

The logical switches 10, 36 and 38 have a fading in time and a fading out time, and the output signal is the result of an interpolation of both input signals during the fading time, such that the transition between the states of the function engaged does not cause any discontinuous transient.

Considering a flight control surface command, the term augmentation command is used in aviation to refer to an additive signal summed with all other pre-existing commands, such that, other commands may be added to this augmentation command performing other desirable functions. For instance, the spoilers may perform other functions as roll spoilers, speed brake, ground spoilers and others.

The invention claimed is:

1. A flight control system for an aircraft having at least one control surface for pitch control and a drag device for producing drag and increasing the angle of the descent path, the flight control system comprising:
   a processor structured for receiving a pitch command from a pilot or an autopilot system and monitoring a plurality of flight parameters including angle of attack to ensure that the flight parameters are within a safe operating envelope of the aircraft, and
   at least one controller coupled to the processor and to the control surface for pitch control and the drag device, the at least one controller controlling the control surface for pitch control and the drag device;
   the processor being further structured to generate an output to the at least one controller to move the control surface to control aircraft pitch based on the pitch command and the flight parameters;
   the processor being further structured to produce an output to the at least one controller to move the drag device to reduce the drag produced by the drag device when the angle of attack of the aircraft is greater than a reference value,
   wherein the drag device comprises a spoiler, and one of said plurality of flight parameters is hyper-lifting device deployment status and said output of the processor to reduce the drag of the spoiler is generated in response to a hyper-lifting device being deployed or deployed beyond a reference state.

2. A flight control system according to 1 claim wherein said processor is arranged to generate a Boolean function of a plurality of logical inputs associated with the plurality of flight parameters.

3. A flight control system according to claim 1 which is arranged in use to deploy the drag device to a bias position and to vary the orientation thereof about the bias position in accordance with a spoiler augmentation signal which is a function of a longitudinal pilot or autopilot command signal and of said output of the processor.

4. A flight control system according to claim 3 wherein said output of the processor comprises a gating signal arranged to gate said spoiler augmentation signal.

5. A flight control system according to claim 1 which is arranged in use to deploy the drag device to a bias position only if the aircraft is inside the safe operating envelope.

6. A flight control system according to claim 5 which is arranged in use to respond to an input from a pilot switch which prevents deployment of said drag device to said bias position.

7. A flight control system according to claim 1 wherein at least one longitudinal flight control surface is controlled by a pilot or autopilot command signal in accordance with a function of said command signal, said function being modified in accordance with said output of the processor.

8. A flight control system according to claim 7 wherein said output of the processor is a selection signal arranged to select one of a plurality of different functions.

9. A flight control system according to claim 7 wherein said pitch control surface is an elevator.

10. A flight control system according to claim 1 wherein the drag device comprises at least one pitch trim device controlled by said output of said processor.

11. A flight control system according to claim 1 wherein one of said plurality of flight parameters is a pilot or autopilot thrust command signal and said output of the processor to reduce the drag of the drag device is generated in response to the commanded thrust being below a reference value.

12. A flight control system according to claim 1 wherein one of said plurality of flight parameters is angle of attack of the aircraft and said output of the processor to reduce the drag of the drag device is generated in response to the angle of attack being above a reference value.

13. A flight control system according to claim 1 wherein one of said plurality of flight parameters is airspeed of the aircraft and said output of the processor to reduce the drag of the drag device is generated in response to the airspeed being below a reference minimum value.

14. A flight control system according to claim 1 wherein one of said plurality of flight parameters is airspeed of the aircraft and said output of the processor to reduce the drag of the drag device is generated in response to the airspeed being above a reference maximum value.

15. A flight control system according to claim 1 wherein one of said plurality of flight parameters is on ground/in air status and said output of the processor to reduce the drag of the drag device is generated in response to the aircraft being on ground.

16. A flight control system according to claim 1 wherein one of said plurality of flight parameters is a stall warning system margin and said output of the processor to reduce the drag of the drag device is generated in response to the aircraft exceeding the stall warning system margin.

17. A flight control system according to claim 1 wherein one of said plurality of flight parameters is the deployment status of the aircraft landing gear.

18. A flight control system for an aircraft having a flight control surface for pitch control and a drag device for producing drag and controllably increasing the angle of the descent path of the aircraft, the flight control system comprising:
   a processor structured for receiving a pitch command from a pilot or an autopilot system and monitoring a plurality of flight parameters including angle of attack to ensure that the flight parameters are within a safe operating envelope of the aircraft, wherein said processor is arranged to compute a Boolean function of a plurality of logical inputs associated with the respective flight parameters and to generate an output signal for controlling the flight control surface for pitch control,
   the flight control system being arranged to generate the output signal based on the pitch command and the flight parameters, the processor being further structured to change the generated output signal to move the flight control surface to reduce drag produced by the flight control surface when the angle of attack of the aircraft is greater than a reference value,
   wherein the drag device comprises a spoiler and the processor is further structured to produce an output to move the spoiler to reduce the drag produced by the spoiler when the angle of attack of the aircraft is greater than a reference value, and
   one of said plurality of flight parameters is hyper-lifting device deployment status and said output of the processor to reduce the drag of the spoiler is generated in response to a hyper-lifting device being deployed or deployed beyond a reference state.

19. A flight control system according to claim 18 wherein said processor controls the flight control surface in response to the pilot or autopilot pitch command in accordance with a function of said pitch command, said function being modified in accordance with said output signal.

20. A flight control system according to claim 19 wherein said output signal comprises a selection signal arranged to select one of a plurality of different functions.

21. A flight control system according to claim 18 wherein said longitudinal flight control surface comprises an elevator.

22. An aircraft including:
   a pilot or autopilot system that provides a pitch command;
   a spoiler for producing drag and increasing the angle of the descent path of the aircraft;
   a control surface for pitch control, and
   a flight control system comprising:
   a processor structured to receive the pitch command from the pilot or autopilot system and to monitor a plurality of flight parameters including angle of attack to ensure that the flight parameters are within a safe operating envelope of the aircraft, and
   a controller coupled to the processor and to the drag device, the controller being arranged to control the control surface for pitch control and to keep the aircraft within the safe operating envelope by moving the spoiler to reduce the drag produced by the spoiler when the angle of attack of the aircraft is greater than a reference value,
   wherein one of said plurality of flight parameters is hyper-lifting device deployment status and said output of the controller to reduce the drag the spoiler produces is generated in response to a hyper-lifting device being deployed or deployed beyond a reference state.

* * * * *